STRUCTURE FOR SUB-ASSEMBLIES OF ELECTRONIC EQUIPMENT

Filed Dec. 7, 1954

INVENTOR.
Persa R. Bell
AND
Cecil C. Harris
BY Roland A. Anderson
ATTORNEY

United States Patent Office

2,880,262

Patented Mar. 31, 1959

2,880,262

STRUCTURE FOR SUB-ASSEMBLIES OF ELECTRONIC EQUIPMENT

Persa R. Bell and Cecil C. Harris, Oak Ridge, Tenn., assignors to the United States of America as represented by the United States Atomic Energy Commission Application December 7, 1954, Serial No. 473,770

1 Claim. (Cl. 174—50)

This invention relates to sub-assemblies or units for electronic systems and more particularly to a unit which is self-contained and which may be adapted for quick application to and the detachment from a chassis or panel.

In the electronic art, manufacturers of certain equipment, such as portable communication sets, computers, analyzers, etc., are using sub-miniature components almost to the exclusion of miniature and full size components. This change of component size has, of necessity, changed the methods of assembly and structure of such equipment. Printed circuits have been developed as well as sub-miniature tube sockets, etc., to facilitate assembly. Many pieces of equipment are fabricated into sub-assemblies and then "plugged in" to complete the equipment. Printed circuits have a disadvantage since they cannot be altered with ease and plug-in units often introduce spurious signals due to small resistances that develop on the plug contacts.

Applicants with a knowledge of these problems of the prior art and inherent disadvantages arising therefrom have for an object of their invention the provision of a novel structure of electronic sub-assemblies, particularly for use in pulse detection and analysis equipment.

Applicants have as another object of their invention the provision of an improved structure for sub-assemblies to facilitate the association and fabrication of equipment in which sub-miniature components are utilized.

Applicants have as another object of their invention the provision of equipment which can generally be divided into sub-assemblies containing a pair of electron tubes, i.e., the two tubes which form a multivibrator circuit or the tubes that form a scale-of-two in scalers.

Applicants have as a further object of their invention the provision of the structure which serves the dual purpose of a cover or enclosure for a sub-assembly and also acts as a clamp for retaining a base plate in position on a chassis in such a manner as to restrict lateral movement along the chassis while performing the function of a snap fastener for quick attachment to and detachment from the chassis.

Applicants have as a still further object of their invention the provision of an arrangement for mounting electrical circuit components and tube sockets on a non-conducting base plate through openings or holes of such diameter that they furnish rigid support for maintaining the elements in place as well as providing passage ways for the electrical leads associated with the equipment.

Other objects and advantages of our invention will appear from the following specifications and accompanying drawings, and the novel features thereof will be particularly pointed out in the annexed claims.

In the drawings Figure 1 is a plan view of a base upon which sub-miniature components are mounted.

Figure 1:
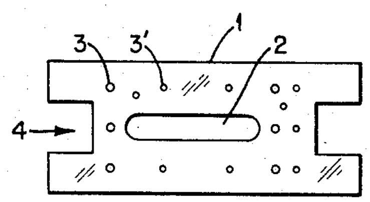

Referring now to the drawings and particularly to Figure 1, a thin elongated base plate 1 forms the foundation for a sub-assembly. This plate 1 is fabricated from suitable insulating material, such as "Lucite." Provided centrally in the plate 1 is a generally rectangular slot 2 having a width preferably equal to the smaller dimension of a sub-miniature electron tube base and a length preferably equal to twice the larger dimension of the tube base. Numerous openings or holes 3, 3′ are also provided in the plate 1. The diameter of some of these holes 3 is preferably made equal to the diameter of the resistor leads including insulated covering, while the diameter of others 3′ is equal to that of bare "hookup" wire. The ends or opposed edges of the base or of the plate 1 are provided with notches or recesses 4, the purpose of which will be referred to more in detail hereinafter.

Figure 2:
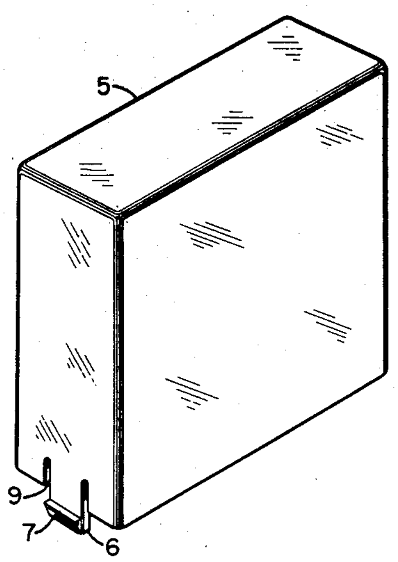
Figure 2 is a perspective of an enclosure for our improved sub-assembly unit.
Figure 4:
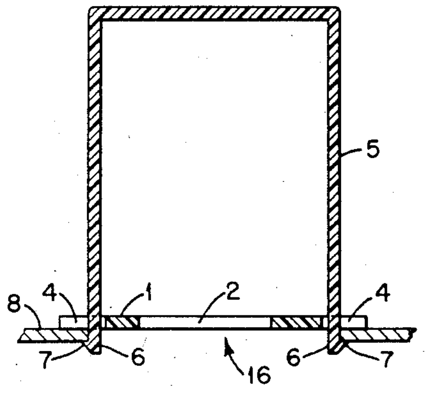
Figure 4 is a sectional elevation of the base plate, cover and chassis shown in assembled relation.

Referring now to Figure 2, each base plate 1 has an accompanying box-shaped cover on enclosure 5. This cover or enclosure has its end walls slit at 9 and is provided with a pair of fingers or ears 6, which project downwardly from the extremities of the opposite end walls adjacent or between slits 9. The extremities of the fingers or ears 6 are tapered upwardly from their free ends to provide extending barbs or shoulders 7. The cover 5 has a dual purpose: (*a*) that of physically protecting the components of a sub-assembly; and (*b*) that of fastening the base plate 1, and thus a sub-assembly, to a chassis 8. This latter purpose is accomplished when the fingers or extensions 6 are received in the grooves or recesses 4 of base plate 1 to interlock them. In Figure 4 it is seen that the extensions 6 pass downwardly through the aforementioned notches 4 in the base plate 1 and the opening 16 in the chassis 8, and the barbs or shoulders 7 hook behind or against the lower surface of the chassis 8. The slits 9 are provided in the cover 5 on either side of the ears 6 to increase the flexibility of the ears 6 so that a sub-assembly unit is more easily added to, or removed from the chassis 8. The chassis 8 is generally provided with an elongated slot so as to receive and mount a multiplicity of sub-assemblies side by side.

Figure 3:
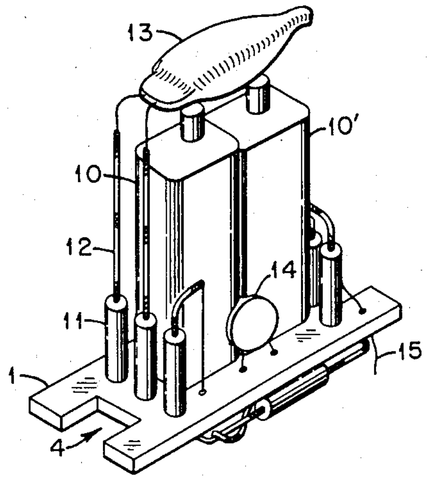
Figure 3 is a perspective of a scale-of-two counter fabricated using the sub-miniature components.

Figure 3 shows numerous components assembled on a base plate 1. This particular sub-assembly is a scale-of-two unit for a scaler. A pair of electron tubes 10, 10′ are fitted into the slot 2. The necessary resistors 11 have at least one of their leads fitted into appropriate holes 3 that act as sockets therefor, and support the resistors in place. The leads 12 of the resistors 11 provide all the bus bars and terminals for the entire sub-assembly. The leads (not shown) from the tubes 10, 10′ are fastened to the proper terminals as are the leads from the neon tube 13 and necessary capacitors 14. Pieces of "hook-up" wire 15 are added where necessary so as to provide connections to another similar sub-assembly. All connections are soldered to prevent undesired signals arising from faulty connections.

In this arrangement it will be noted that the various components are inserted in the base 1, of transparent plastic or other suitable material, in such a manner that it serves as a construction jig as well as a mounting plate for the finished unit. The cover 5, which may also be of transparent plastic, may then slip over the assembly of components on base 1 and enclose them. In doing so the extensions 6, 6 on the cover pass down thru the recesses 4, 4 in the base plate 1 and thru the slotted portions of chassis 8. As the shoulders 7, 7 pass the lower edges of slot in chassis 16 they snap back against the lower surface of chassis 8, and interlock cover 5, plate 1 and chassis 8 in assembled relation. Power connections are made by means of short leads which attach to small tinned-copper busses (not shown) running the length of the chassis. Cascading connections (not shown) may be made directly from sub-assembly to sub-assembly.

A unit may be removed from the chassis 8 by simply depressing fingers 6, 6 inwardly towards each other until the shoulders 7, 7 clear the edges of the walls of the slot 16 in the chassis 8. When this is done the cover may be slipped off over the unit and the base plate 1 becomes detached from the chassis 8.

Having thus described our invention, we claim:

A subchassis assembly comprising a flat chassis having slots, a base plate having recessed portions at opposite ends, said base plate being disposed on said chassis with its recessed portions lying over a slot in said chassis, a housing having an open end, the open end of said housing resting on said base plate, fingers formed on the lower extremity of said housing over recessed portions of the base plate and extending through the recessed portions of said base plate and the chassis slot, shoulders on said fingers, said shoulders pressing against the underside of said chassis when the housing abuts the base plate, said housing having a slit extending from the lower edge of the housing on either side of said fingers to provide for depressive movement of said fingers to disengage the shoulders from the chassis.

References Cited in the file of this patent

UNITED STATES PATENTS

| | | |
|---|---|---|
| 1,721,775 | Fallon | July 23, 1929 |
| 2,165,575 | Polydoroff | July 11, 1939 |
| 2,449,646 | Emde | Sept. 21, 1948 |
| 2,665,353 | Popp | Jan. 5, 1954 |
| 2,668,933 | Shapiro | Feb. 9, 1954 |

FOREIGN PATENTS

| | | |
|---|---|---|
| 607,465 | Great Britain | Aug. 31, 1948 |

OTHER REFERENCES

Publication: "Daven Seald-Ohm," published 1945, by The Daven Company of Newark, New Jersey. (Copy in 317–242.)